United States Patent Office 2,883,032
Patented Apr. 21, 1959

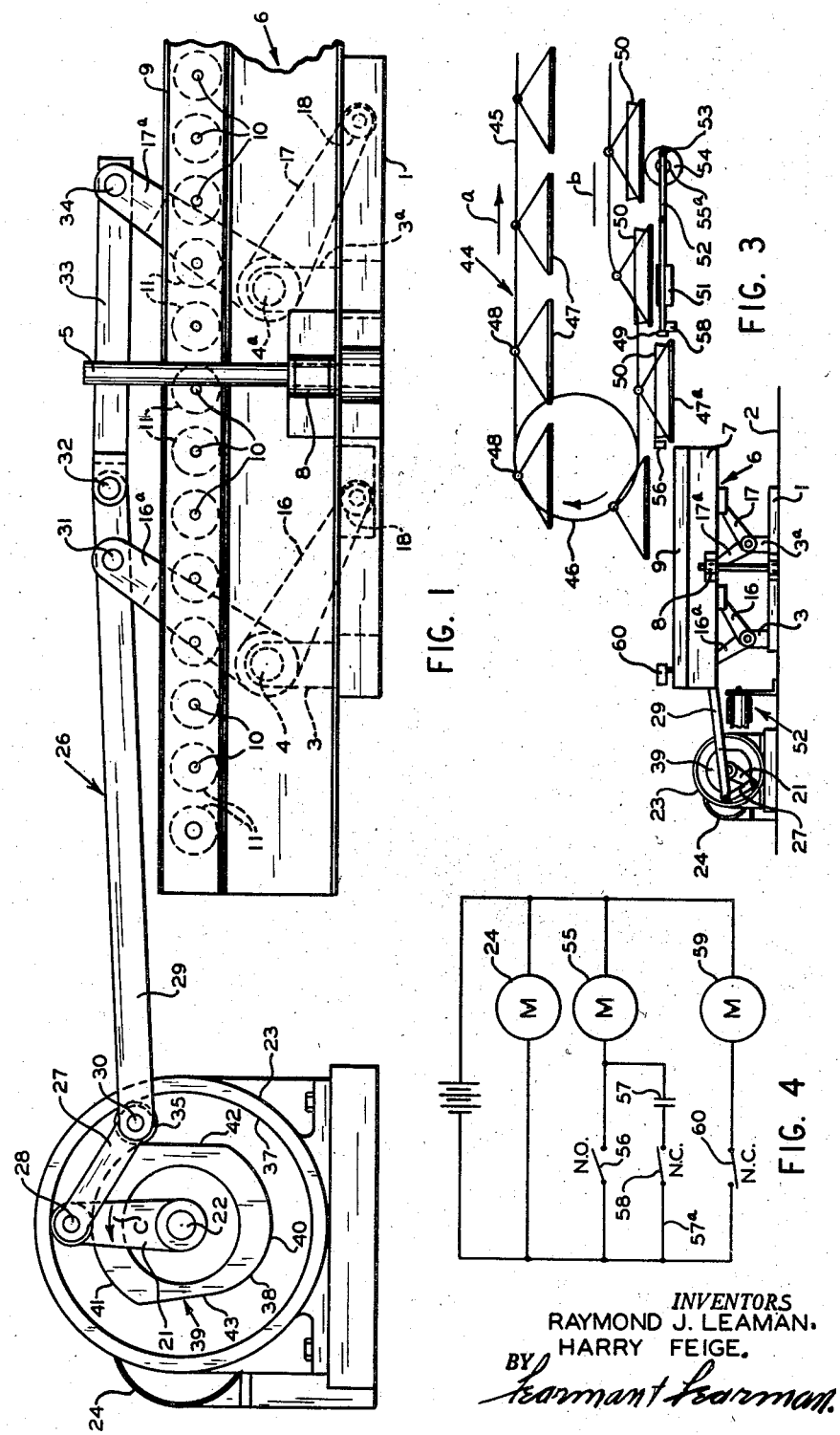

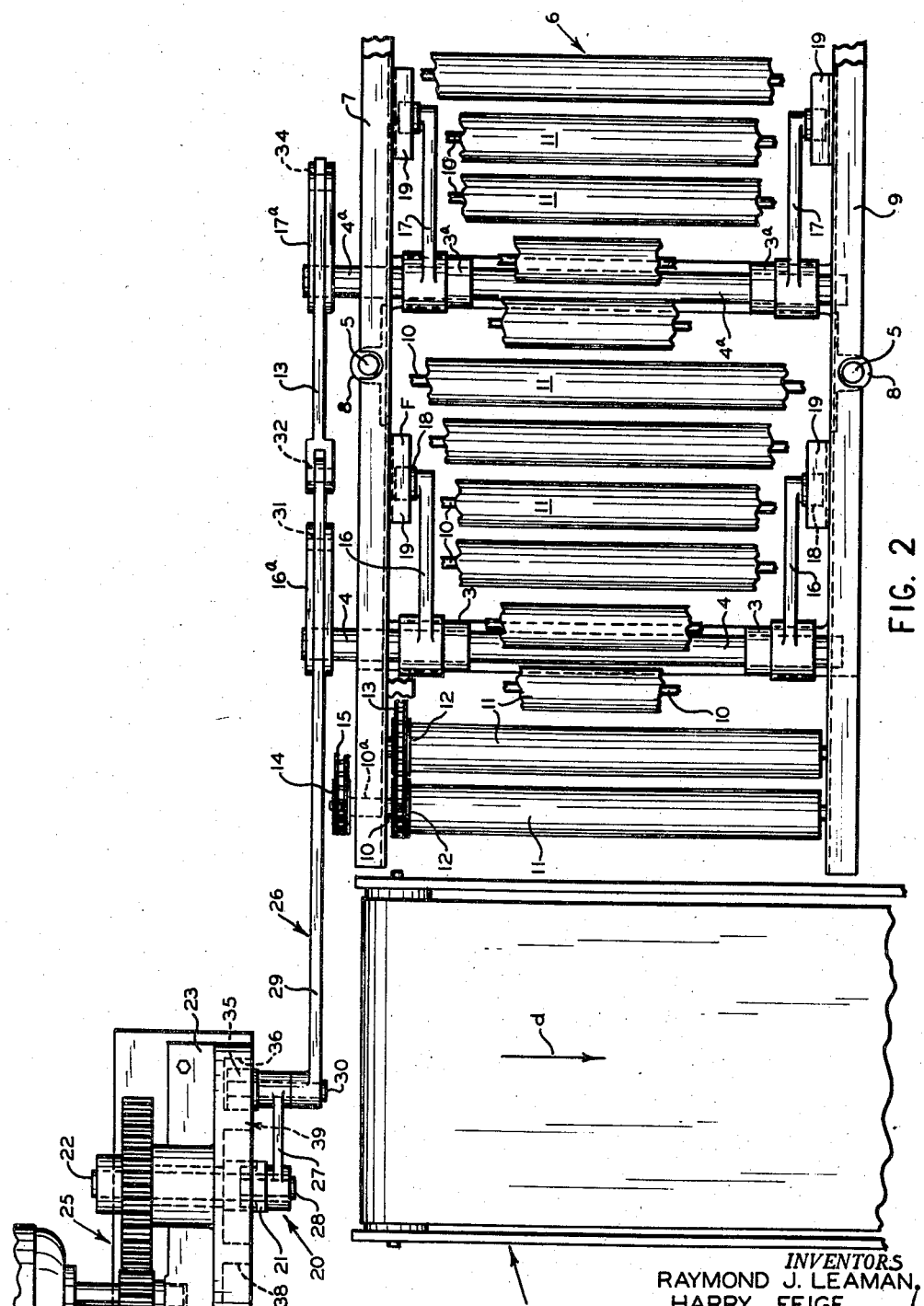

2,883,032

ARTICLE TRANSFER APPARATUS

Raymond J. Leaman and Harry Feige, Saginaw, Mich., assignors to Baker Perkins Inc., Saginaw, Mich.

Application June 4, 1956, Serial No. 589,142

16 Claims. (Cl. 198—24)

This invention relates to article transfer apparatus primarily for use in conjunction with commercial bake ovens of the kind utilizing a continuously driven, endless conveyor by means of which articles such as pans containing dough are supported and conveyed through a baking cycle, the transfer apparatus being so constructed as to permit automatic unloading of the pans from the conveyor at the end of the baking cycle and transferring of them to another conveyor or the like by which they may be transferred to other locations for further processing.

Apparatus of the kind with which the invention is concerned preferably includes an article supporting and transferring platform or table which is shiftable from a bake pan receiving position substantially at the level at which the pans are supported by the oven conveyor to a different level at which the pans are to be discharged so as to avoid interference among the oven unloading apparatus, the bake pans, and the oven loading apparatus normally associated with commercial baking equipment. In order to prevent damage to the mechanisms and parts of the equipment and to maintain the baked products in good condition, it is desirable that the article transfer apparatus be substantially stationary at its receiving and discharging positions or levels.

One of the objects of this invention is to provide transfer apparatus for use in conjunction with continuously operating automatic bake ovens, the apparatus being shiftable from an article receiving level to an article discharging level and return, and being substantially stationary at each of those levels for a sufficient period of time to permit the articles to be received by or discharged from the transfer device before it begins its movement to its other level.

Another object of the invention is to provide such transfer apparatus having continuously operating driving means for effecting shifting movements of the article receiving and discharging device to its several positions so as to eliminate the necessity for switches, valves, or circuits and the like for interrupting movement of the transfer device at its receiving and discharging positions.

A further object of the invention is to provide self-contained, positive driving means for a shiftable article transfer platform of the kind referred to.

Other objects and advantages of the invention will be referred to specifically or will become apparent from the following specification, the appended claims, and the accompanying drawings in which:

Figure 1 is a side elevation of a portion of transfer apparatus according to the invention;

Figure 2 is a top plan of the apparatus shown in Figure 1;

Figure 3 is a side elevation on a reduced scale of the transfer apparatus and showing diagrammatically oven equipment of the kind with which the apparatus is intended for use; and Figure 4 is a circuit diagram.

Transfer apparatus constructed in accordance with the invention comprises a base frame 1 adapted to be secured to a floor 2 and including two pairs of upstanding bearing supports 3, 3ª arranged on opposite sides of the frame. A rock shaft 4 is rotatably journalled by means of bearings (not shown) carried by the pair of bearing supports 3, and a similar shaft 4ª is similarly journalled in the pair of bearing supports 3ª. Also mounted at opposite sides of the base frame 1 are upstanding posts 5, the purpose of which is to provide means for mounting and guiding a platform or table frame 6 for vertical movements relative to the base frame 1.

The table frame 6 includes a pair of parallel lower frame members 7, each of which carries a substantially centrally located element 8 provided with an opening for the accommodation of its associated post 5. The table frame also includes a pair of upper frame members 9 which are provided on their inwardly facing surface with means (not shown) for rotatably journalling a plurality of transversely arranged, longitudinally spaced, parallel shafts 10, each of which mounts a roller 11 for rotation therewith. The rollers 11 constitute the article supporting and transferring surface of the transfer apparatus.

It is preferred that the rollers 11 be power driven to insure that articles deposited thereon at one end of the platform will be propelled to the other end of the platform and for the accomplishment of this objective each of the shafts 10 has keyed or otherwise suitably secured thereto a sprocket wheel 12 (see Figure 2). A sprocket chain 13 is entrained around the several sprocket wheels 12 so that rotation of one roller will be transmitted to the other rollers and all of the rollers will rotate at a uniform speed. In the disclosed embodiment of the invention, the shaft 10 of an end roller 11 is extended as at 10ª so as to project through and beyond an upper side frame member 9 and provide a mount for a sprocket wheel 14 which may be driven in the desired direction by means of a sprocket chain 15 entrained around the wheel 14 and around a driving pinion mounted on an electric motor (not shown) or the like carried by the table frame 6. When the apparatus is arranged in the manner shown in Figure 3, the rollers 11 should be driven in a direction to cause articles supported thereon to be propelled from right to left.

Mounted fast on the rock shaft 4 is a pair of lever arms 16 and a similar pair of lever arms 17 is mounted fast on the rock shaft 4ª. Each of the lever arms 16, 17 includes a roller 18 mounted at its free end, the roller being laterally offset from the plane of its lever arm as is best shown in Figure 2. Each roller extends under a horizontal flange 19 which is secured to the lower side frame member 7 of the table frame and is of such length as to overhang the roller in all positions to which the latter may be moved. Fast on corresponding ends of the shafts 4, 4ª is mounted another lever arm 16ª, 17ª, each of which extends substantially at right angles to the respective levers 16, 17, and has a length substantially the same as the length of its associated lever.

The arrangement of the parts described thus far is such that counterclockwise rocking of the lever arms 16ª and 17ª from the positions shown in Figure 1 about the axes of their respective rock shafts 4 and 4ª will cause corresponding rocking of the lever arms 16, 17 and cause the rollers 18 to bear against the under surface of the flanges 19 and exert an upward force to effect vertical shifting movement of the table frame from the position shown in Figure 1 to the position shown in Figure 3. Clockwise rocking of the levers 16ª, 17ª from the positions shown in Figure 3 will permit the table frame 6 to move downwardly due to its own weight. In each instance, the table frame will be guided in its movements by the posts 5 and the parts 8.

Apparatus constructed in accordance with the invention includes driving means 20 for effecting raising and lowering of the table frame 6, the driving means preferably comprising a continuously revolving crank 21 keyed to a shaft 22 journalled in suitable bearings (not shown) mounted in a housing 23 and being driven by an electric motor 24 through suitable reduction gearing 25. The motion of the driving crank 21 is transmitted to the shift levers 16 and 17 by means of a linkage 26 interconnecting the crank and the shift levers. As is best shown in Figure 2, the interconnecting linkage 26 comprises a drag link 27 pivotally connected at one end to the crank by a pin 28 and pivotally connected at its other end to one end of a connecting rod 29 by a pin 30. The connecting rod 29 is pivotally connected adjacent to its other end to the shift lever 16$^a$ by means of a pin 31, and at its extremity, the connecting rod 29 is pivoted by a pin 32 to one end of a connecting link 33. The opposite end of the connecting link 33 is pivotally secured to the shift lever 17$^a$ by a pin 34.

The pivot pin 30 which connects the drag link 27 and the connecting rod 29 also performs the function of mounting a roller part or cam follower 35 on the interconnecting linkage for movement therewith. As is best shown in Figure 2, the part 35 projects laterally of the link 27 and extends into a slot 36 formed in the face of the housing 23. One wall 37 of the slot 36 is smooth or regular and is circular in shape, but the other wall 38 of the slot is irregular and forms a stationary cam or control member 39 which is, in effect, interposed between the driving crank and the motion transmitting linkage since it lies in the path of the cam follower or part 35. The purpose of the cam 39 is to control the action of the shift levers 16, 17 in a manner yet to be described. The cam is so shaped that it has two lobes 40 and 41 each of which is formed on an arc of a circle, the two lobes being angularly spaced from one another by straight surfaces or dwells 42, 43.

A typical installation of transfer apparatus constructed in accordance with the invention is diagrammatically illustrated in Figure 3. A bake oven (not shown) includes an endless conveyor 44 usually comprising a pair of endless chains 45 entrained around sprocket wheels, one of which is shown at 46, the sprocket wheels being continuously driven by suitable means (not shown) to cause the upper and lower runs of the chains to travel in the direction of the arrows $a$ and $b$, respectively. A plurality of open ended trays 47 is suspended from crossrods 48 supported between the chains in a manner to permit the trays to remain horizontal at all times. The lower run of the conveyor chain 45 may consist of two interconnected horizontal reaches at different levels to enable a horizontally reciprocating plunger 49 to be actuated by suitable means (not shown) and push articles such as bake pans 50 off the supporting trays 47.

In the operation of the apparatus, the continuously running conveyor will advance loaded trays 47 to the position occupied by the tray 47$^a$ in Figure 3. As the tray 47$^a$ approaches this position, the driving crank 21, which revolves continuously in the direction of the arrow $c$ (Figure 1), will be approaching the position shown in Figure 3, at which position the cam follower 35 is at the upper end or beginning of the straight cam surface 43 and the shift levers 16 and 17 support the table frame 6 at its upper or article receiving level. The article receiving level of the table frame is only sufficiently lower than the level of the trays to provide clearance therebetween. Also, as the tray 47$^a$ approaches the position shown in Figure 3, the plunger 49 will be actuated to cause it to extend from its cylinder 51 and engage the rear surface of the pan 50. The speed at which the plunger is actuated is considerably greater than the speed at which the conveyor 44 moves, thereby assuring that the pans 50 may be pushed off their trays and the plunger retracted without causing interference between the plunger and the following trays.

As the pan 50 is being pushed forwardly off the tray 47$^a$, the cam follower 35 will be traversing the straight cam surface 43 under the influence of the pull on the drag link 27 by the crank 21. Although the crank, the drag link and the connecting rod 29 will be moving at this time, the movement of the cam follower will be substantially vertical due to the straight cam surface 43. Thus, there will be substantially no transmission of motion to the shift levers 16, 17 and the table frame will remain at its article receiving level for a period of time sufficient to enable the pan 50 to be deposited on the rollers 11 without its being subjected to a drop of any material distance.

By the time the tray 50 has been deposited on the rollers 11, the crank 21 will have pulled the drag link 27 and the cam follower 35 through an arc such that the cam follower will be at the lower end of the straight cam surface 43. Further rotation of the crank will cause the cam to traverse the arcuate lobe portion 40 of the cam. This movement of the cam follower has a large horizontal component, so the linkage 26 will be capable of horizontal motion towards the right, as viewed in Figures 2 and 3, causing the shift levers to be rocked clockwise, thereby lowering the table frame 6 to its lower or article discharging level shown in Figure 1. During the lowering of the table frame, the driven rollers 11 will have propelled the pan 50 from the right hand end to the left hand end of the article supporting surface.

When the table frame has been lowered to its article discharging level, the crank 21, the drag link 27, and the motion transmitting linkage 26 will have reached positions in which the cam follower 35 will be at the lower end or beginning of the dwell or straight cam surface 42. As the crank rotates further the cam follower will traverse the substantially vertical surface 42, but since the motion of the cam follower is substantially vertical, the transmission of motion to rock the shift levers 16 and 17 will be temporarily interrupted and the table frame will remain at its discharging or lower level. At this level, the pan 50 will be propelled off the table frame by the rollers 11 and onto an endless belt or the like conveyor 52, the upper run of which travels in a direction transverse to the direction in which the pan was propelled over the table frame 6 as is indicated by the arrow $d$ in Figure 2. The height of the upper run of the conveyor 52 is substantially the same as the height of the article supporting surface of the table frame when the latter is at its article discharging level so as to enable the pans to be transferred without being subjected to a drop.

By the time the pan 50 has been transferred to the conveyor 52, the driving crank and its associated parts will be in the position shown in Figure 1, whereupon further rotation of the crank will cause counterclockwise rotation of the shift levers 16 and 17 to elevate the table frame 6 in the manner previously described. Succeeding pans are transferred from the oven conveyor to the conveyor 52 in a similar manner.

From the foregoing description of the operation of the transfer apparatus it will be apparent that for one complete revolution of the driving crank 21, the table frame 6 is shifted vertically from its article receiving level to its article discharging level, and returned to its receiving level. It also will be clear that, although the driving crank operates continuously, the positioning of the stationary control cam 39 in the path of the cam follower 35 results in temporary interruptions of the operation of the shift levers when the table frame reaches either of its two levels.

Although not described in detail, it will be understood that the speeds at which the several conveyors and the cranks are driven will be such that the apparatus will function in the manner described.

In Figure 4 we have shown an electrical control circuit which may be employed to control the timed operations of the various elements. Motor 24 is, of course, driven continuously. The pusher 49 may be a connecting rod reciprocating in a linear path because it is mounted in elongated guide 51. The rod 49 could be connected to a crank arm 52 mounted eccentrically as at 53 on a wheel 54 driven by the armature shaft 55a of a motor 55. Normally open limit switch 56 is disposed in the path of the pan on tray 47a as shown and its contact arm is actuated to close a conventional magnetic type holding relay 57 in circuit 57a to operate motor 55 until the pusher has completed a full stroke, and at the end of its return travel depressed a normally closed limit switch 58 in its path which is connected to break the relay 57. The limit switches 56 and 58 are conventional, of course, and they are connected to the relay in the usual manner to make and break the relay as described. By the time the pusher has completed its stroke the link 21 is in position to lower the table so that the pans on the table will descend out of the path of the oncoming tray 47a. A motor 59 driving the chain 15 through a reducer (not shown) can be driven to power the rolls 11 which are also driven intermittently at a relatively slow rate of speed. The normally closed limit switch 60 in series with motor 59 is disposed in the path of the table such that the switch arm will be depressed when the table nears the upper limit of its travel and the motor 59 will be deenergized. Thus when the rolls 11 are receiving the pans from the pusher they are at rest and the motor 59 is not again energized until the table descends. As will be apparent from an inspection of Figure 1 the cam faces 42 and 43 are actually slightly vertically inclined so that the table is stationary while it is being loaded and when it is unloading to the conveyor 52.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. Transfer apparatus for receiving articles at one level from an oven conveyor or the like and discharging them at another level, said apparatus comprising a base frame; a table frame having an article supporting surface; means mounting said table frame for vertical movements relative to said base frame; means mounted on one of said frames operable to shift said table frame vertically relatively to said base frame from its article receiving level to its article discharging level and return; continuously operating driving means; means operated by said driving means and connected to said shift means for transmitting motion from said driving means to said shift means, said motion transmitting means including a part movable therewith; and control means positioned in the path of said part for temporarily interrupting operation of said shift means by said motion transmitting means at positions of said table frame corresponding to its article receiving and discharging levels.

2. Transfer apparatus for receiving articles at one level from an oven conveyor or the like and discharging them at another level, said apparatus comprising a base frame; a table frame having an article supporting surface; means mounting said table frame for vertical movements relative to said base frame; means mounted on said base frame operable to shift said table frame vertically relatively to said base frame from its article receiving level to its article discharging level and return; continuously operating driving means; means operated by said driving means and connected to said shift means for transmitting motion from said driving means to said shift means, said motion transmitting means including a part movable therewith; and control means positioned in the path of said part for temporarily interrupting operation of said shift means by said motion transmitting means at positions of said table frame corresponding to its article receiving and discharging levels.

3. Transfer apparatus for receiving articles at one level from an oven conveyor or the like and discharging them at another level, said apparatus comprising a base frame; a table frame having an article supporting surface; means mounting said table frame for vertical movements relative to said base frame; means mounted on one of said frames operable to shift said table frame vertically relatively to said base frame from its article receiving level to its article discharging level and return; continuously operating driving means; means operated by said driving means and connected to said shift means for transmitting motion from said driving means to said shift means, said motion transmitting means including a cam follower movable therewith; and a cam positioned in the path of said cam follower for temporarily interrupting operation of said shift means by said motion transmitting means at positions of said table frame corresponding to its article receiving and discharging levels.

4. Transfer apparatus for receiving articles at one level from an oven conveyor or the like and discharging them at another level, said apparatus comprising a base frame; a table frame having an article supporting surface; means mounting said table frame for vertical movements relative to said base frame; means mounted on said base frame operable to shift said table frame vertically relatively to said base frame from its article receiving level to its article discharging level and return; continuously operating driving means; means operated by said driving means and connected to said shift means for transmitting motion from said driving means to said shift means, said motion transmitting means including a cam follower movable therewith; and a cam positioned in the path of said cam follower for temporarily interrupting operation of said shift means by said motion transmitting means at positions of said table frame corresponding to its article receiving and discharging levels.

5. Transfer apparatus for receiving articles at one level from an oven conveyor or the like and discharging them at another level, said apparatus comprising a base frame; a table frame having an article supporting surface; means mounting said table frame for vertical movements relative to said base frame; lever means having an arm mounted on one of said frames for rocking movement about a substantially horizontal axis and being so connected at one of its ends to the other of said frames that rocking movement of said lever means about said axis causes vertical movement of said table frame relative to said base frame; continuously operating driving means; means operated by said driving means and connected to another arm of said lever means for imparting rocking movement to said lever means in first one direction and then in the reverse direction, said operated means including a part movable therewith; and control means positioned in the path of said part for temporarily interrupting rocking movement of said lever means at positions of the latter corresponding to the article receiving and article discharging levels of said table frame.

6. Transfer apparatus for receiving articles at one level from an oven conveyor or the like and discharging them at another level, said apparatus comprising a base frame; a table frame having an article supporting surface; means mounting said table frame for vertical movements relative to said base frame; lever means having an arm mounted on said base frame for rocking movement about a substantially horizontal axis and being so connected at one of its ends to the other of said frames that rocking movement of said lever means about said axis causes vertical movement of said table frame relative to said base frame; continuously operating driving means; means operated by said driving means and connected to another arm of said lever means for imparting rocking movement to said lever means in first one direction and then in the reverse direction, said operated means including a part movable therewith; and control means positioned in the path of said part for temporarily interrupting rocking movement of said lever means at positions of the latter corresponding to the article receiving and article discharging levels of said table frame.

7. Transfer apparatus for receiving articles at one level from an oven conveyor or the like and discharging them at another level, said apparatus comprising a base frame; a table frame having an article supporting surface; means mounting said table frame for vertical movements relative to said base frame; lever means having an arm mounted on one of said frames for rocking movement about a substantially horizontal axis and being so connected at one of its ends to the other of said frames that rocking movement of said lever means about said axis causes vertical movement of said table frame relative to said base frame; continuously operating driving means; means operated by said driving means and connected to another arm of said lever means for imparting rocking movement to said lever means in first one direction and then in the reverse direction, said operated means including a cam follower movable therewith; and a cam positioned in the path of said cam follower for interrupting rocking movement of said lever means at positions of the latter corresponding to the article receiving and article discharging levels of said table frame.

8. Transfer apparatus for receiving articles at one level from an oven conveyor or the like and discharging them at another level, said apparatus comprising a base frame; a table frame having an article supporting surface; means mounting said table frame for vertical movements relative to said base frame; lever means having an arm mounted on said base frame for rocking movement about a substantially horizontal axis and being so connected at one of its ends to the other of said frames that rocking movement of said lever means about said axis causes vertical movement of said table frame relative to said base frame; continuously operating driving means; means operated by said driving means and connected to another arm of said lever means for imparting rocking movement to said lever means in first one direction and then in the reverse direction, said operated means including a cam follower movable therewith; and a cam positioned in the path of said cam follower for temporarily interrupting rocking movement of said lever means at positions of the latter corresponding to the article receiving and article discharging levels of said table frame.

9. Transfer apparatus for receiving articles at one level from an oven conveyor or the like and discharging them at another level, said apparatus comprising a base frame; a table frame having an article supporting surface; means mounting said table frame for vertical movements relative to said base frame; means mounted on one of said frames operable to shift said table frame vertically from its article receiving level to its article discharging level and return; continuously operating driving means; means interconnecting said driving means and said shift means, said interconnecting means including a part movable therewith; and control means interposed between said driving means and said shift means in the path of said part for temporarily interrupting operation of said shift means when said table frame has been shifted to either of its said levels, whereby at each of said levels said table frame is substantially stationary.

10. Transfer apparatus for receiving articles at one level from a conveyor and discharging them at another level, said apparatus comprising a base frame; a table frame having an article supporting surface; means mounting said table frame for vertical movement relative to said base frame; shift means mounted on said base frame operable to shift said table frame vertically from its article receiving level to its article discharging level and return; continuously operating driving means; means interconnecting said driving means and said shift means, said interconnecting means including a part movable therewith; and control means interposed between said driving means and said shift means in the path of said part for temporarily interrupting operation of said shift means when said table frame has been shifted to either of its said levels whereby at each of said levels said table frame is substantially stationary.

11. Transfer apparatus for receiving articles at one level from a conveyor and discharging them at another level, said apparatus comprising a base frame; a table frame having an article supporting surface; means mounting said table frame for vertical movements relative to said base frame; shift means mounted on one of said frames operable to shift said table frame vertically from its article receiving level to its article discharging level and return; continuously rotating driving means; means interconnecting said driving means and said shift means, said interconnecting means including a part movable therewith; and control means interposed between said driving means and said shift means in the path of said part for temporarily interrupting operation of said shifting means when said table frame has been shifted to either of its said levels whereby at each of said levels said table frame is substantially stationary.

12. Transfer apparatus for receiving articles at one level from a conveyor and discharging them at another level, said apparatus comprising a base frame; a table frame having an article supporting surface; means mounting said table frame for vertical movements relative to said base frame; shifting means mounted on said base frame operable to shift said table frame vertically from its article receiving level to its article discharging level and return; continuously operating driving means; driven means interconnecting said driving means and said shifting means; and control means interposed between said driving means and said driven means for temporarily interrupting operation of said shift means when said table frame has been shifted to either of its said levels whereby at each of said levels said table frame is substantially stationary.

13. In combination, continuously driven first conveyor means for transporting articles to be baked through an oven baking cycle; means for removing baked articles from said first conveyor means at the end of the baking cycle; second conveyor means located at a different level than the level of said first conveyor means for conducting said baked articles away from the oven; and transfer apparatus for receiving articles from said first conveyor means at the level of the latter and discharging them at the level of the second conveyor means, said transfer apparatus comprising a base frame, a table frame having an article supporting surface and including means for moving an article across said surface, means mounting said table frame for vertical movements relative to said base frame, means mounted on one of said frames operable to shift said table frame vertically relatively to said base frame from its article receiving level to its article discharging level and return, continuously operating driving means, means operated by said driving means and connected to said shift means for transmitting motion from said driving means to said shift means, said motion transmitting means including a part movable therewith, and control means positioned in the path of said part for temporarily interrupting operation of said shift means by said motion transmitting means at positions of said table frame corresponding to its article receiving and discharging levels.

14. In combination, continuously driven first conveyor means for transporting articles to be baked through an oven baking cycle; means for removing baked articles from said first conveyor means at the end of the baking cycle; second conveyor means located at a different level than the level of said first conveyor means for conducting said baked articles away from the oven; and transfer apparatus for receiving articles from said first conveyor means at the level of the latter and discharging them at the level of the second conveyor means, said transfer apparatus comprising a base frame, a table frame having an article supporting surface and including means for moving an article across said surface, means mounting said table frame for vertical movements relative to said base frame, means mounted on one of said frames operable to shift said table frame vertically relative to said base frame from its article receiving level to its article discharging level and return, continuously operating driving means, means operated by said driving means and connected to said shift means for transmitting motion from said driving means to said shift means, said motion transmitting means including a cam follower movable therewith, and a cam positioned in the path of said cam follower for temporarily interrupting operation of said shift means by said motion transmitting means at positions of said table frame corresponding to its article receiving and discharging levels.

15. In combination, continuously driven first conveyor means for transporting articles to be baked through an oven baking cycle; means for removing baked articles from said first conveyor means at the end of the baking cycle; second conveyor means located at a different level than the level of said first conveyor means for conducting said baked articles away from the oven; and transfer apparatus for receiving articles from said first conveyor means at the level of the latter and discharging them at the level of the second conveyor means, said transfer apparatus comprising a base frame, a table frame having an article supporting surface and including means for moving an article across said surface, means mounting said table frame for vertical movements relative to said base frame, lever means having an arm mounted on one of said frames for rocking movement about a substantially horizontal axis and being so connected at one of its ends to the other of said frames that rocking movement of said lever means about said axis causes vertical movement of said table frame relative to said base frame, continuously operating driving means, means operated by said driving means and connected to another arm of said lever means for imparting rocking movement to said lever means in first one direction and then in the reverse direction, said operated means including a cam follower movable therewith, and a cam positioned in the path of said cam follower for interrupting rocking movement of said lever means at positions of the latter corresponding to the article receiving and article discharging levels of said table frame.

16. In combination, continuously driven first conveyor means for transporting articles to be baked through an oven baking cycle; means for removing baked articles from said first conveyor means at the end of the baking cycle; second conveyor means located at a different level than the level of said first conveyor means for conducting said baked articles away from the oven; and transfer apparatus for receiving articles from said first conveyor means at the level of the latter and discharging them at the level of the second conveyor means, said transfer apparatus comprising a base frame, a table frame having an article supporting surface and including means for moving an article across said surface, means mounting said table frame for vertical movements relative to said base frame, means mounted on one of said frames operable to shift said table frame vertically from its article receiving level to its article discharging level and return, continuously operating driving means, means interconnecting said driving means and said shift means, said interconnecting means including a part movable therewith, and control means interposed between said driving means and said shift means in the path of said part for temporarily interrupting operation of said shift means when said table frame has been shifted to either of its said levels, whereby at each of said levels said table frame is substantially stationary.

References Cited in the file of this patent

UNITED STATES PATENTS

| | | |
|---|---|---|
| 2,146,615 | Bishop | Feb. 7, 1939 |
| 2,217,020 | Jurgens et al. | Oct. 8, 1940 |
| 2,673,640 | Temple | Mar. 30, 1954 |
| 2,731,109 | Schlemmer | Jan. 17, 1956 |